United States Patent
Cox et al.

(10) Patent No.: US 6,655,515 B2
(45) Date of Patent: Dec. 2, 2003

(54) MODULAR BI-DIRECTIONAL OVERRUNNING WHEEL CLUTCH

(75) Inventors: C. Paul Cox, Sellersburg, IN (US); Vance E. Coble, Campbellsburg, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 10/154,266

(22) Filed: May 23, 2002

(65) Prior Publication Data

US 2002/0179391 A1 Dec. 5, 2002

Related U.S. Application Data

(60) Provisional application No. 60/293,332, filed on May 24, 2001.

(51) Int. Cl.$^7$ .................... F16D 15/00; F16D 41/067
(52) U.S. Cl. ............................................ 192/38; 192/50
(58) Field of Search ................ 192/38, 44, 49, 192/50; 56/11.7, 11.8; 74/650

(56) References Cited

U.S. PATENT DOCUMENTS

| | | | | |
|---|---|---|---|---|
| 1,106,605 A | * | 8/1914 | Waterous | 192/50 |
| 1,141,319 A | * | 6/1915 | Coykendall | 192/50 |
| 1,191,699 A | * | 7/1916 | Hopper | 192/50 |
| 1,232,244 A | * | 7/1917 | Dick | 192/50 |
| 3,124,972 A | | 3/1964 | Seliger et al. | 74/650 |
| 3,788,435 A | | 1/1974 | Prueter | 192/35 |
| 3,884,049 A | | 5/1975 | Pauli | 64/14 |
| 4,040,757 A | | 8/1977 | Pauli | 403/356 |
| 4,044,870 A | | 8/1977 | Fogelberg | 192/89 W |
| 4,116,320 A | | 9/1978 | Quilliam | 192/89 A |
| 4,226,315 A | | 10/1980 | Kagata | 192/38 |
| 4,230,211 A | | 10/1980 | Goto et al. | 192/35 |
| 4,266,646 A | | 5/1981 | Telford | 192/67 R |
| 4,289,224 A | | 9/1981 | Dobberpuhl | 192/50 |
| 4,296,848 A | | 10/1981 | Kagata et al. | 192/35 |
| 4,848,508 A | | 7/1989 | Smirl et al. | 180/248 |
| 4,909,365 A | | 3/1990 | Tillitson et al. | 192/35 |
| 5,036,939 A | | 8/1991 | Johnson et al. | 180/233 |
| 5,103,690 A | | 4/1992 | Macpherson et al. | 74/665 GB |
| 5,307,911 A | | 5/1994 | Robinson | 192/31 |
| 5,348,126 A | | 9/1994 | Gao | 192/7 |
| 5,971,123 A | | 10/1999 | Ochab et al. | 192/48.2 |
| 6,062,361 A | | 5/2000 | Showalter | 192/38 |
| 6,199,884 B1 | | 3/2001 | Doroftei | 280/252 |
| 6,209,697 B1 | | 4/2001 | Austin | 192/45 |

OTHER PUBLICATIONS

The Hilliard Corporation, Motion Contrl Division, "Overruning Clutches for Turf and Lawn & Garden Equipment", Feb. 28, 1999 or earlier.

The Hilliard Corporation, "Long–Lasting Roller–Ramp Assembly", Jan. 8, 2001.

* cited by examiner

Primary Examiner—Richard M. Lorence
(74) Attorney, Agent, or Firm—Baker & Daniels (57) ABSTRACT

A modular, self-contained, bi-directional wheel clutch unit selectively attachable and detachable as a unit to and from an axle, the unit including a rotatable wheel-driving hub including a casing portion, a clutch cage disposed in the casing portion and surrounded thereby and which has a plurality of circumferentially-distributed openings, a rotatably driven cam element disposed in the casing portion and surrounded by the clutch cage and which has a plurality of discrete surfaces thereon, and a plurality of rollers rotatably disposed within the casing portion and within the clutch cage openings. The rollers are located between the casing portion and the cam element discrete surfaces and have an engaged position wherein the cam element and the hub are in binding engagement through the rollers and the hub is rotatably driven by the cam element, and a disengaged position wherein the hub is freely rotatable relative to the cam element.

20 Claims, 7 Drawing Sheets

MODULAR BI-DIRECTIONAL OVERRUNNING WHEEL CLUTCH

CROSS-REFERENCE TO RELATED APPLICATION

This application claims the benefit under 35 U.S.C. §119 (e) of U.S. Provisional Application No. 60/293,332, filed May 24, 2001.

BACKGROUND OF THE INVENTION

1. Field of the Invention

The present invention relates to clutches useful for lawn and garden implements, specifically bi-directional overrunning clutches.

2. Description of the Related Art

Lawn and garden implements, for example, mowers, tillers and snow throwers, often comprise a transaxle through which power from an engine is transmitted to ground-engaging wheels attached to axles extending from the transaxle for propelling the implement. These implements are often difficult to steer, owing to their weight, size, or the particular way in which the geartrain of the transaxle is designed. As to their geartrain design, many transaxles are provided with a solid axle which transmits an equal amount of torque to each of the pair of ground-engaging wheels, and during a turn, the wheel at the inside of the turn rotates at the same speed as the wheel at the outside of the turn; the wheel at the inside of the turn must be skidded on the ground to some degree, a considerable degree for sharp turns, in order to negotiate the turn. Controlling the implement can thus be a problem for some operators having insufficient strength or weight to force the implement through the turn as desired.

Previous attempts to address this problem include providing the transaxle with a differential, which allows the two ground-engaging wheels to rotate at different speeds, as is well known in the art. Through use of a differential, the wheel at the inside of the turn is not skidded on the ground during the turn; rather it slows down, while the wheel at the outside of the turn correspondingly speeds up. Differential arrangements, while improving the amount of control during cornering, add considerable cost to the transaxle. Moreover, even if the implement is provided with a differential-equipped transaxle, a not insubstantial amount of force is still required to initiate the turn and hold the implement therethrough. Thus, transaxles having differential arrangements do not provide satisfactorily controllable implements for all operators.

Another possible approach is the use of clutches to control the implement by powering or disengaging power from the ground engaging wheels, thereby providing a limited means for steering the implement. Some clutches which provide such control include means for selective disengagement of the input and output members (see, e.g., U.S. Pat. Nos. Re. 25,229, 2,951,568, and 3,429,408) or, specifically, include a spring which expands to produce engagement between the input and output members (see, e.g., U.S. Pat. Nos. 3,040,855 and 5,029,689). Previous wheel clutches may also use left and right hand grip-mounted triggers to engage and disengage the clutches. Such systems do provide means for simple engagement and disengagement of the clutches and limited power steering capabilities, but do not provide an intuitive, passive means for easily controlling the turning of the implement.

Another alternative has been steering mechanisms which use bi-directional overrunning clutches at each wheel. One such clutch is the Bi-Directional Clutch, designed and manufactured by the Motion Control Division of Hilliard Corporation of Elmira, N.Y. A change in the direction and/or speed of the implement causes the bi-directional clutch to sense the change and to allow overrunning of its connected wheel. Sensing the change in direction and speed is accomplished with a roller ramp design which allows a roller (maintained within a roll cage) to move between an outer race and multiple flat cams to engage and disengage the engine and transaxle. This clutch must be assembled directly to the axle, piece-by-piece, such as would occur when the implement is originally manufactured. Thus, as a practical matter, this clutch may only be added to an implement by the original equipment manufacturer, thereby preventing the operator of the implement from easily adding the clutch to an existing implement.

SUMMARY OF THE INVENTION

The inventive wheel clutch unit is modular, self-contained, and is assembled as a unit to the axle of a walk-behind machine, such as a lawnmower or a snow thrower. Furthermore, the clutch is bi-directional, similar to previous bi-directional overrunning clutches; however, unlike the previous overrunning clutches, the inventive modular and self-contained clutch unit does not need to be assembled to an implement component-by-component or by the implement manufacturer. The modular, self-contained clutch may be assembled separately and added to an existing implement after the final assembly and sale to a consumer. Additionally, a consumer may add the clutch to his implement since no assembly of the clutch itself is required by the consumer. The use of a self-contained and modular wheel clutch unit expands the addition of an overrunning clutch to anytime, including after the implement has been sold to the consumer, and by anyone, including the consumer.

The present invention provides a modular, bi-directional wheel clutch unit adapted to be assembled to the driving axle of a walk-behind machine including a rotatable wheel-driving hub including a casing portion, a clutch cage disposed in the casing portion and surrounded thereby and which has a plurality of circumferentially-distributed openings, a rotatably driven cam element disposed in the casing portion and surrounded by the clutch cage and which has a plurality of discrete surfaces thereon, and a plurality of rollers rotatably disposed within the casing portion and within the clutch cage openings. The rollers are located between the casing portion and the cam element discrete surfaces and have an engaged position wherein the cam element and the hub are in binding engagement through the rollers and the hub is rotatably driven by the cam element, and a disengaged position wherein the hub is freely rotatable relative to the cam element. The wheel clutch unit is self-contained and is selectively attachable and detachable as a unit to and from the axle of the machine.

The present invention further provides, in combination, a walk-behind machine having an engine, an axle rotatably driven by the engine, and a pair of ground engaging wheels, one the wheel located at each end of the axle, and at least one unitized wheel clutch unit. The clutch unit includes a rotatable wheel-driving hub detachably fixed to a the wheel and including a casing portion, a clutch cage disposed in the casing portion and surrounded thereby and having a plurality of circumferentially-distributed openings, a cam element detachably fixed to the axle and disposed in the casing portion, and a plurality of rollers rotatably disposed within the casing portion and within the clutch cage openings. The cam element is surrounded by the clutch cage and having a plurality of discrete surfaces thereon. The rollers are located between the casing portion and the cam element discrete surfaces, and have an engaged position wherein the cam element and the hub are in binding engagement through the rollers and the hub is rotatably driven by the cam element, and a disengaged position wherein the hub is freely rotatable relative to the cam element. The wheel clutch unit is self-contained and is selectively attachable and detachable as a unit to and from the axle of the machine.

The present invention further provides a modular, bi-directional wheel clutch unit adapted to be assembled as a unit to the driving axle of a walk-behind machine including a rotatable casing, a clutch cage disposed in and surrounded by the casing and which has a plurality of openings along a circumference of the clutch cage, a rotatably driven cam element disposed in the casing and surrounded by the clutch cage, and a plurality of rotatable elements rotatably disposed within the casing and within the clutch cage openings. The cam element has a plurality of discrete surfaces thereon. The rotatable elements are located between an interior surface of the casing and the cam element discrete surfaces, the casing being selectively driven by the cam element through selective engagement of the casing with the cam element. The wheel clutch unit is self-contained and is selectively attachable and detachable as a unit to and from the axle of the machine.

The present invention further provides in combination, a walk-behind machine including an engine, an axle driven by the engine, and a pair of ground-engaging wheels, one the wheel at each end of the axle, and a modular, bi-directional wheel clutch assembly assembled as a unit to the axle. The clutch assembly includes a rotatable casing, a clutch cage disposed in and surrounded by the casing and which has a plurality of openings along a circumference of the clutch cage, a rotatably driven cam element disposed in the casing and surrounded by the clutch cage with the cam element having a plurality of discrete surfaces thereon, and a plurality of rollers rotatably disposed within the casing and within the clutch cage openings. The rollers are located between an interior surface of the casing and the cam element discrete surfaces, the casing being selectively driven by the cam element through selective engagement of the casing with the cam element.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention and such exemplification is not to be construed as limiting the scope of the invention in any manner.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended.

Figure 1A:
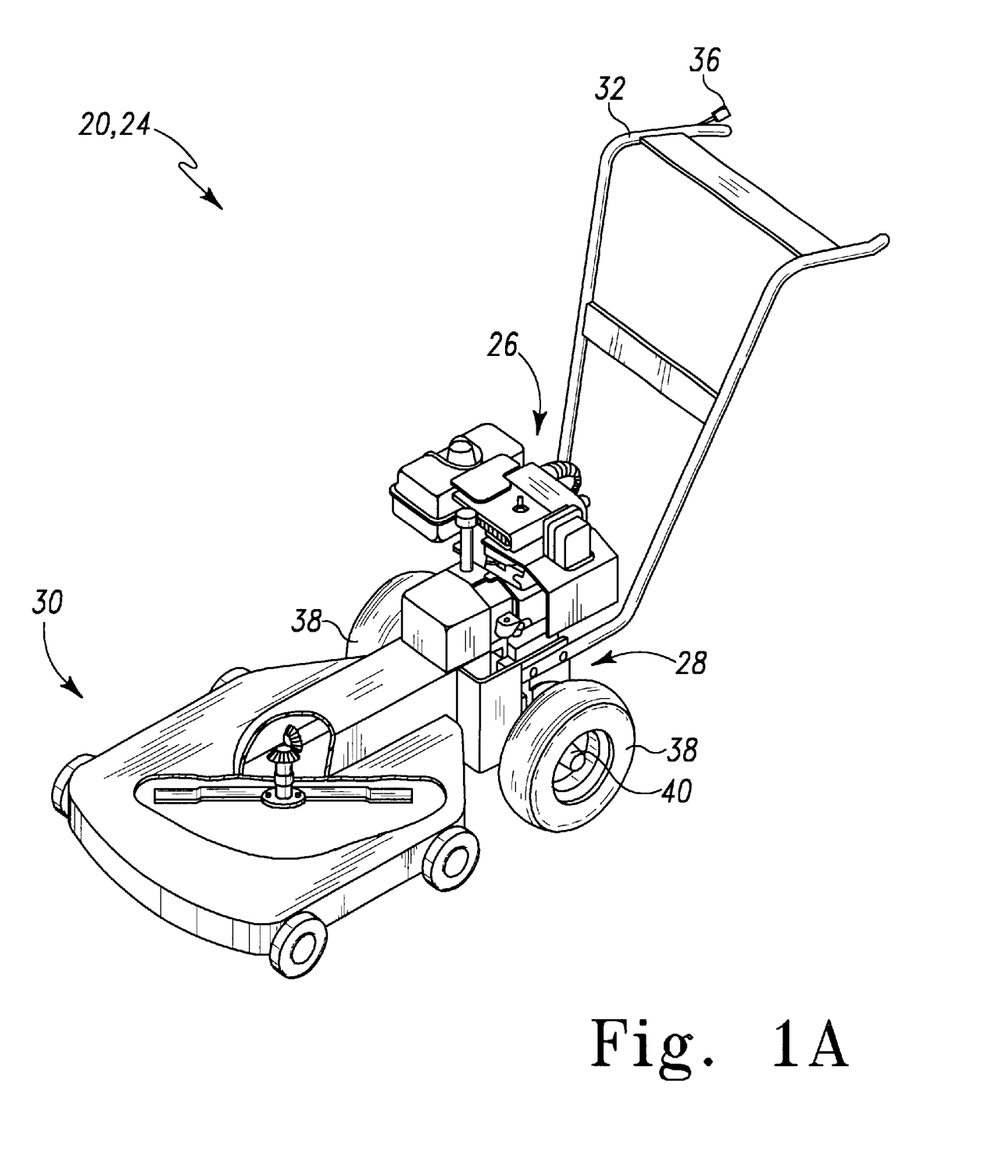
FIG. 1A is a perspective view of an implement which includes a pair of the inventive wheel clutches, the implement shown as a lawnmower.
Figure 1B:
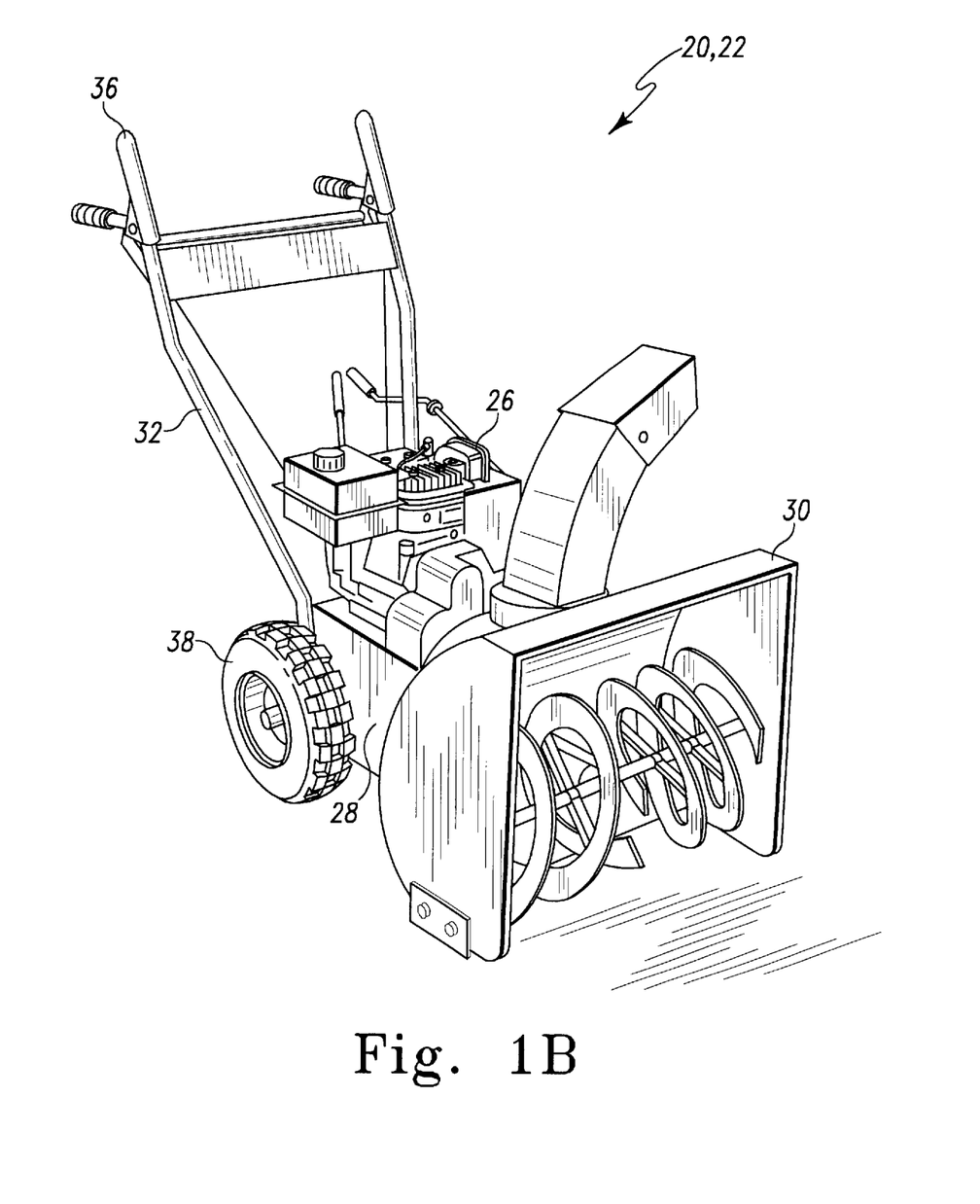
FIG. 1B is a perspective view of an implement which includes a pair of the wheel clutches, the implement shown as a snow thrower.
Figure 1C:
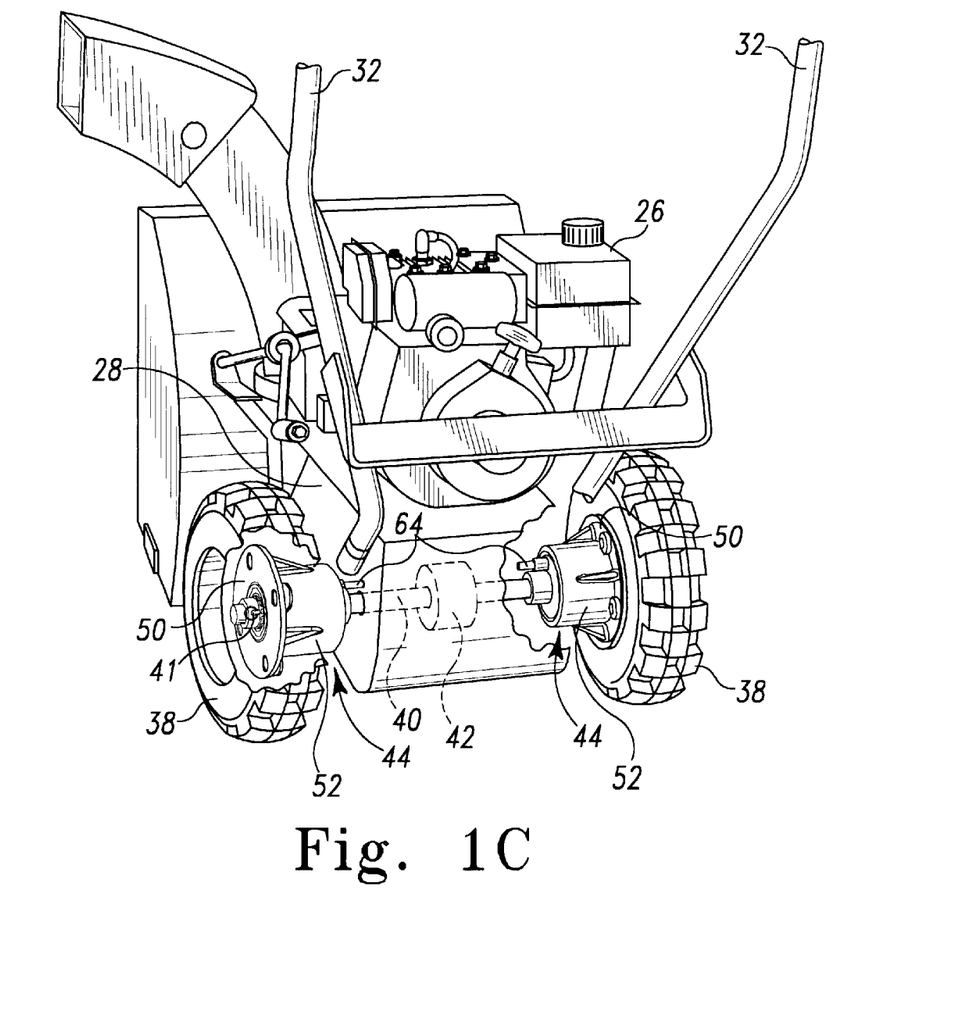
FIG. 1C is a rear view of an implement which includes a pair of the wheel clutches.

Implement 20 is shown in FIGS. 1A and 1B, and schematically in FIG. 1C, and is representatively shown as lawnmower 24 (FIG. 1A) or snow thrower 22 (FIG. 1B). Implement 20 is similar to the implement disclosed in U.S. patent application Ser. No. 09/785,431, filed Feb. 16, 2001, the disclosure of which is expressly incorporated herein by reference, except as otherwise described herein. As shown in FIGS. 1A–1C, implement 20 includes engine 26, frame 28 attached to engine 26 and enclosing a transmission means, working device 30, handle 32, and a pair of wheels 38. Implement 20 also includes an intuitive, passive steering mechanism by which the operator may easily control turning of the implement. Working device 30, as shown in FIG. 1A, is a mower deck assembly including rotating blades within a housing and driven by a shaft operatively connected to the output shaft of the engine, as is known. In a second embodiment, shown in FIG. 1B, working device 30 is a auger assembly including a chute for throwing the snow to the side of the cleared area and an auger mounted on a rotating shaft and housed within a shroud, with the shaft being operatively connected to the output shaft of the engine, as is known.

As shown schematically in FIG. 1C, solid axle 40 is operatively connected to, or a component of, transmission 42, which may be of any suitable type of transmission or transaxle. For example, transmission 42 may be of the known type and basic design exemplified by commercially available 1300, 2500 or 2600 Series transaxles manufactured by Tecumseh Products Company. Alternatively, transmission 42 may include a friction disk or a hydrostatic pump and motor arrangement, such as that disclosed in U.S. Pat. Nos. 6,301,885 and 6,378,300, assigned to the assignee of the present invention, the complete disclosures of which are incorporated herein by reference. Transmission 42, whether a transmission or a transaxle, drives axle 40 and may be operatively connected to a reduction gear train to reduce the speed of the output of transmission 42 relative to axle 40.

It should be noted that handles 32 may include a single grip structure for grasping, as shown in FIG. 1B, or consist of two separate grip portions for grasping, as shown in FIG. 1A. Either structure is suitable for including lever 36 used to facilitate rotation of axle 40 through engagement of a primary drive mechanism (not shown), such as transmission 42, when lever 36 is held down. Alternatively, a bail (not shown) may used in place of lever 36 to engage the primary drive mechanism. A cable (not shown) is connected to lever 36 or the bail for activation of transmission 42.

Figure 2:
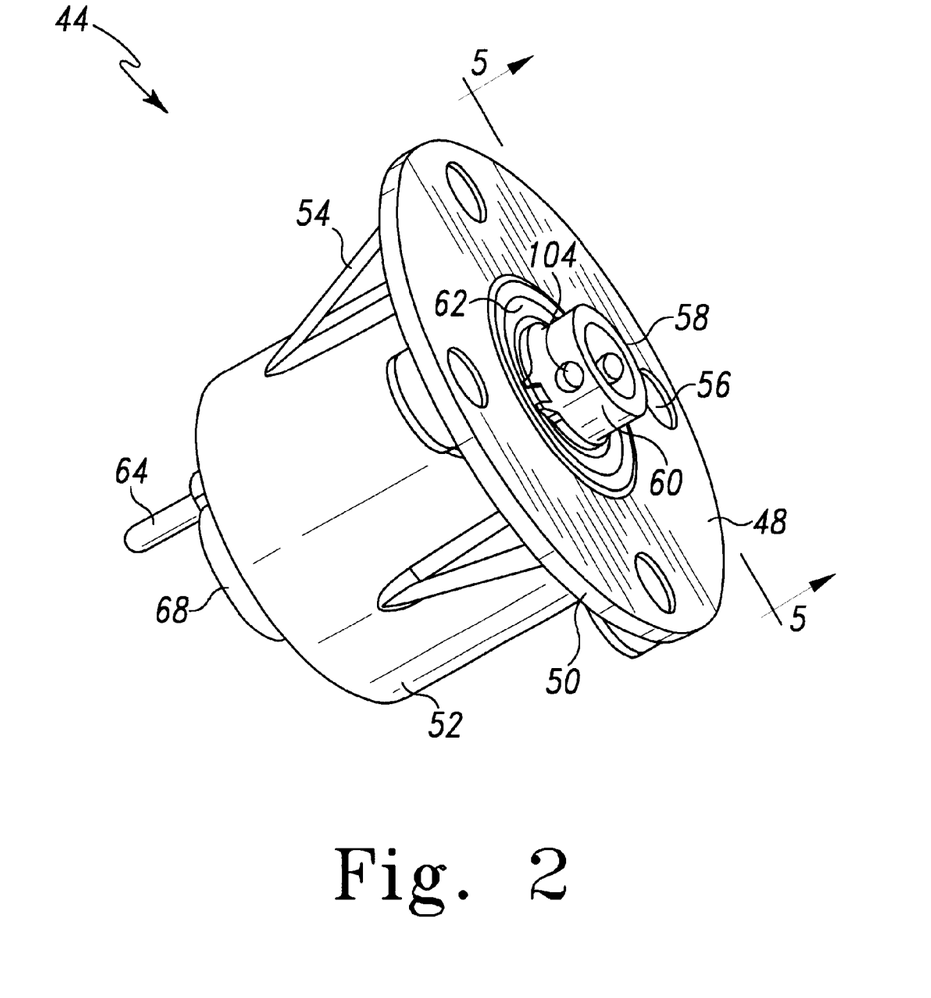
FIG. 2 is a perspective view of the wheel clutch as viewed from its outboard end.
Figure 3:
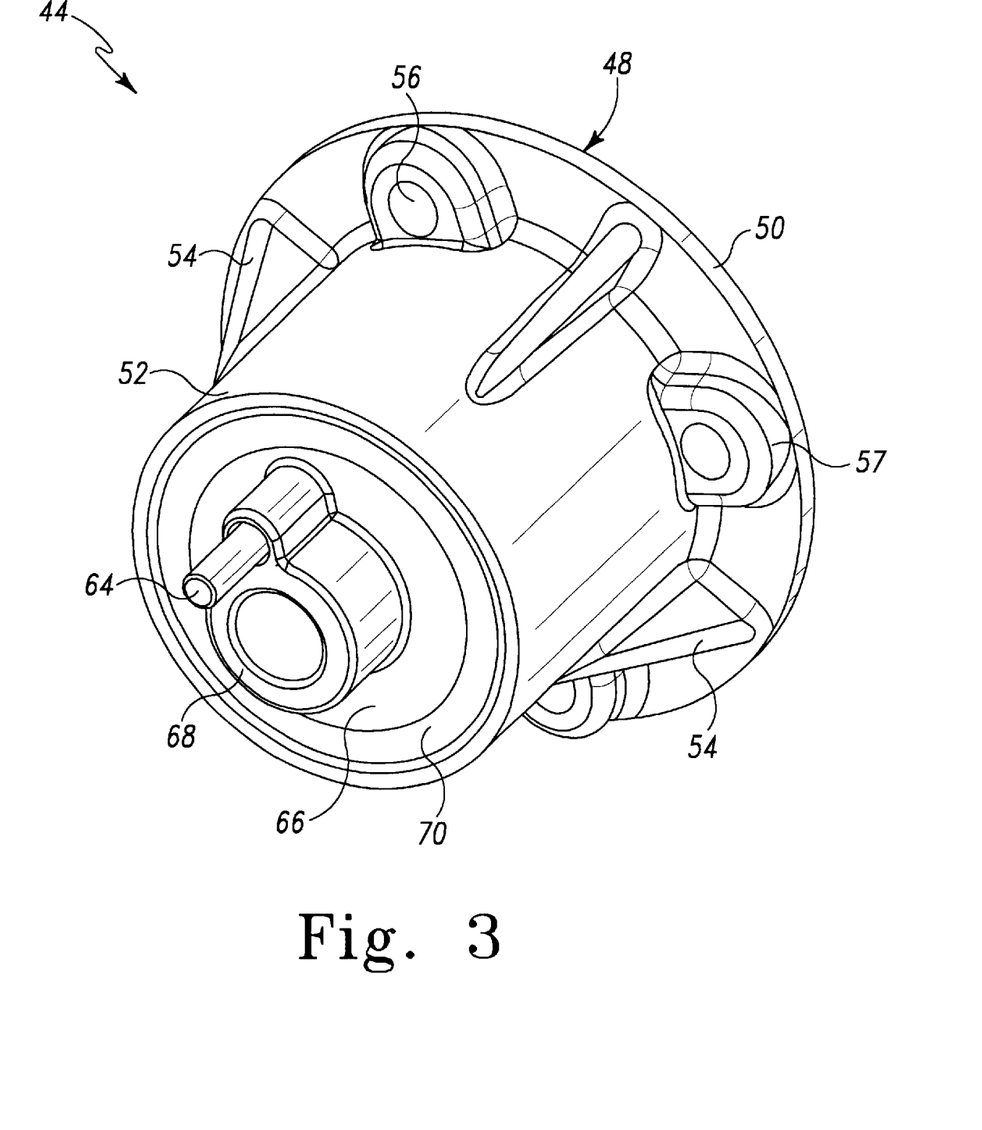
FIG. 3 is a perspective view of the wheel clutch as viewed from its inboard end.

A pair of wheel clutches 44 are provided on axle 40, each wheel clutch 44 operatively coupling a wheel 38 to its respective end of axle 40. Wheel clutch 44 may be assembled separately then connected to axle 40 by the implement manufacturer or by someone other than the implement manufacturer after the assembly of implement 20 is complete. Referring to FIGS. 2 and 3, each wheel clutch 44 includes hub 48 having peripheral flange 50 with a plurality of apertures 56 therein for connection to a ground engaging wheel 38. Surrounding each aperture 56 is a boss 57 integral with flange 50. Also included as a part of hub 48 is casing portion 52 fixed to or integral with flange 50 and reinforced by ribs 54 between casing portion 52 and flange 50.

Shown extending beyond flange 50 is extension 60 of sleeve 58; sleeve 58 is disposed within casing portion 52 and cooperates with a wheel clutch cam, as described hereinbelow. Extension 60 has a pair of diametrically opposed apertures 104 therein for receipt of pin 41 (FIG. 1C) through a diagonal hole in axle 40 to connect each wheel clutch 44 to axle 40. The use of pins is well-known for the attachment of a wheel to an axle; in previous implements, the wheels are rotatably fixed to the axle via the pin, and may be free to rotate relative thereto by extending the pin through the axle hole only. In the embodiment shown, wheel 38 is fixed to wheel clutch 44, via peripheral flange 50, with wheel clutch 44 being attached to axle 40; thus wheel 38 is selectively engaged with axle 40 when wheel clutch 44 is engaged and is disengaged from axle 40 when wheel clutch 44 is disengaged.

Figure 5:
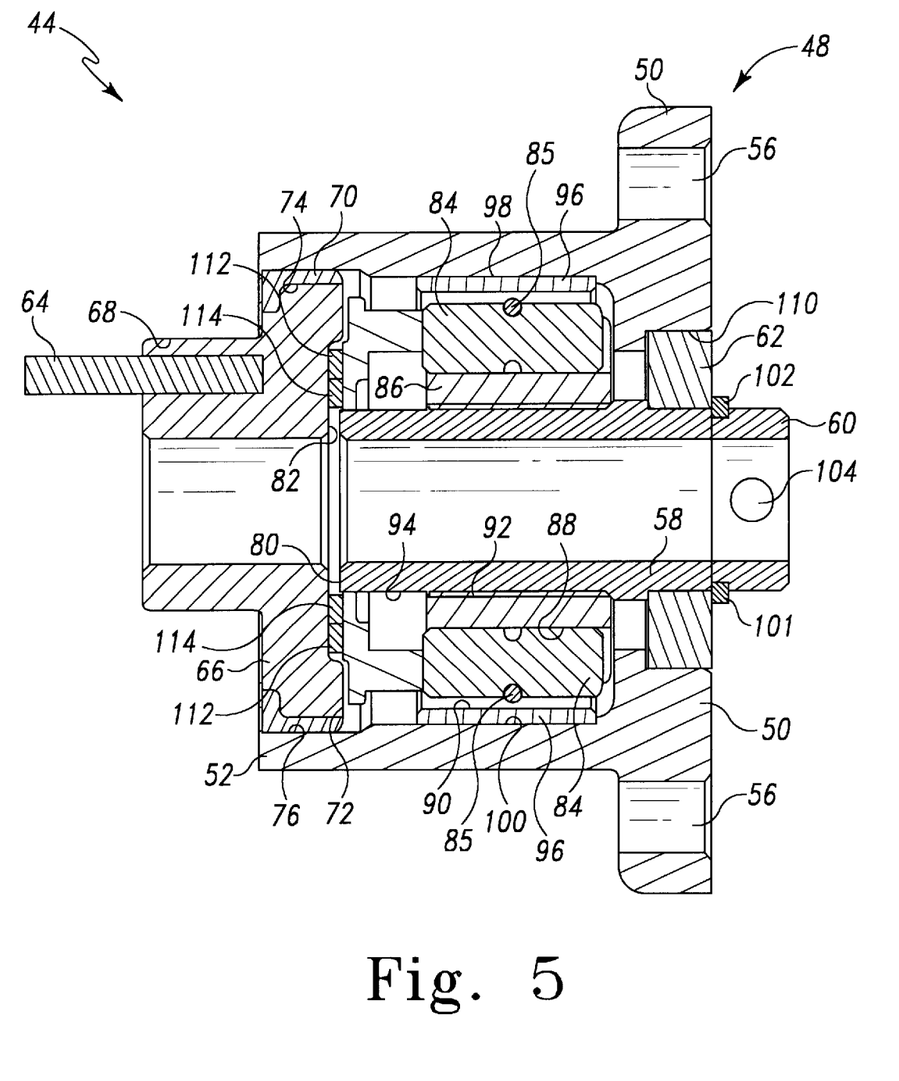
FIG. 5 is a sectional view of the wheel clutch of FIG. 2 taken along line 5—5.

Referring to FIG. 5, disposed between sleeve 58 and hub 48, in recess 110 of hub 48, is bearing 62, which allows sleeve 58 and hub 48 to rotate relative to each other; bearings 62 also support the majority of the weight of implement 20 on axle 40. On the inboard side of wheel clutch 44 is retainer 70 press-fitted into casing portion 52 and enclosing wheel clutch 44. Retainer 70 further includes an aperture therein for receiving bushing 66. Bushing 66 includes extending portion 68 and is rotatably supported on axle 40 extending therethrough. Extending portion 68 has pin 64, which has one end maintained within extending portion 68 and the other end received in a hole in frame 28, to provide a connection to frame 28 and to prevent rotation of bushing 66 relative to implement frame 28.

Figure 4:
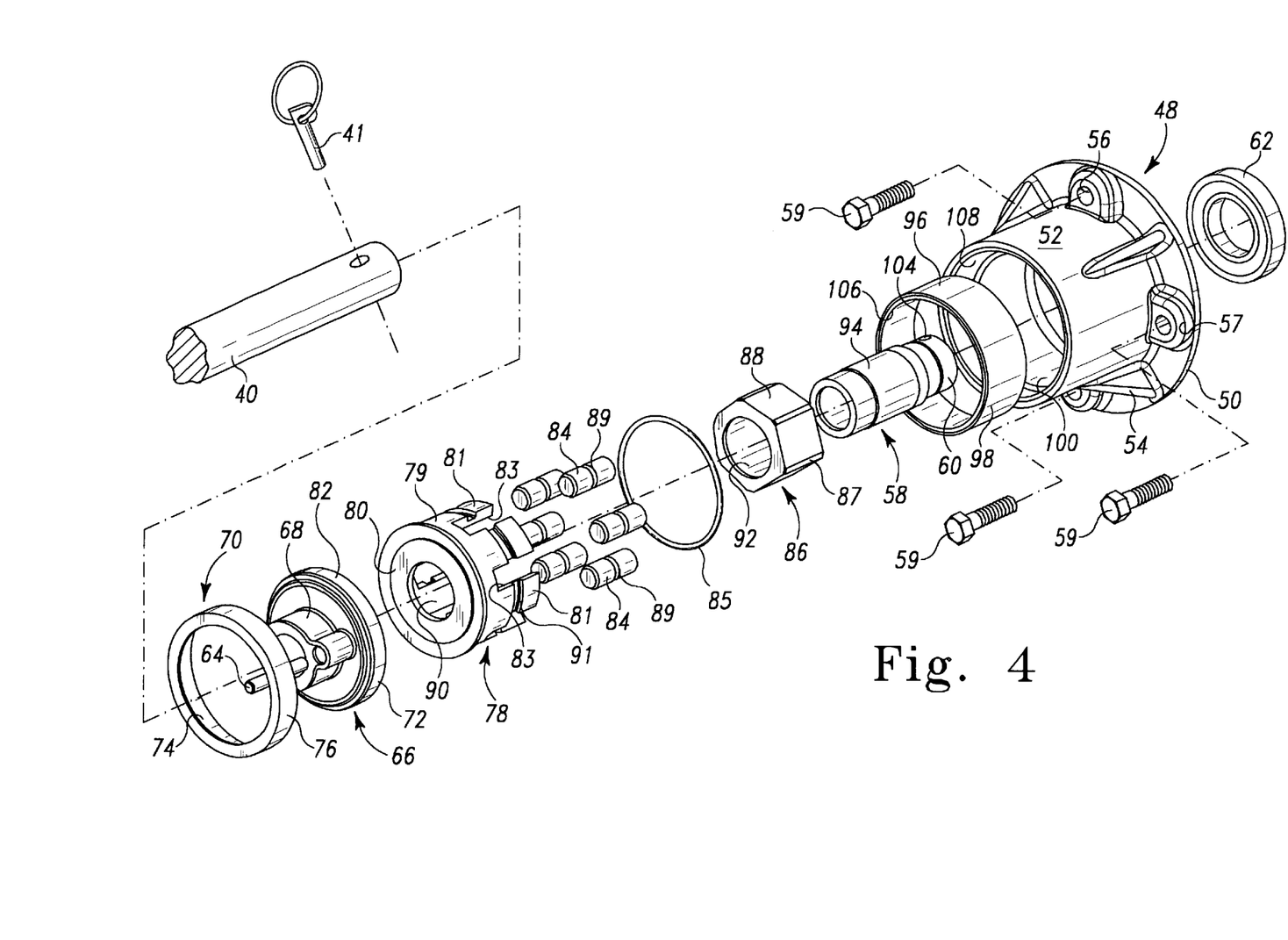
FIG. 4 is an exploded view of the wheel clutch.

With reference to FIGS. 4 and 5, wheel clutch 44 is manufactured as a compact and modular assembly, which may be easily attached to axle 40, as described above. Starting at the inboard side of wheel clutch 44, retainer 70 has outer surface 76, which interfaces with first inner surface 108 of casing portion 52 through a press-fit arrangement, and inner surface 74, which is in sliding engagement with outer surface 72 of bushing 66. Bushing 66 further has flat inner surface 82 facing flat outer surface 80 of wheel clutch cage 78.

Wheel clutch cage 78 is a single piece and has annular portion 79 and a plurality of extensions 81 extending therefrom, with a plurality of openings 83 between extensions 81. Rotatably disposed within each opening 83 is one roller 84, which may rotate in the space provided by opening 83. Additionally, each roller 84 rotates against one flat surface 88 of wheel clutch cam 86, which is positioned within wheel clutch cage 78. Wheel clutch cam 86 is hexagonal in shape, thereby using six rollers 84 for operation. Between cage 78 and wheel clutch cam 86 are thrust bearing 114 (FIG. 5) and wave washer 112 (FIG. 5) which create rotational drag on cage 78 relative to rotating cam 86, which is rotatably fixed to axle 40. This drag urges rollers 84 to edges 87 of surfaces 88, thereby bringing rollers 84 into binding engagement with surface 106 of race 96 (FIG. 4) and surfaces 88 of cam 86. Inner surface 92 of cam 86 interfaces with surface 94 of sleeve 58 through cam 86 and sleeve 58 being brazed, thereby fixing them together.

Rollers 84 are prevented from moving radially outward and away from axle 40 by retaining ring 85. Each roller 84 has annular groove 89 therein and wheel clutch cage 78 has its own annular groove 91; both grooves 89 and 91 are aligned when the rollers 84 are in the openings 83 such that ring 85 is located therein. By using ring 85 and groove 89, each roller 84 is still capable of rotation but is unable to move radially away from axle 40.

Surrounding wheel clutch cage 78 is race 96 which has surface 98 abutting inner surface 100 of casing portion 52. Lastly, bearing 62 is received at the outboard end of wheel clutch 44 in recess 110 in hub 48 to complete the assembly of wheel clutch 44. As noted above, the two bearings 62 also carry the majority of the weight of implement 20 relative to axle 40.

Wheel clutch 44 further includes retaining ring 102 placed in recess 101 in sleeve 58 to prevent axial outward movement of bearing 62. It should be noted that wheel clutch 44 has a modular configuration and does not need to be assembled to axle 40 piece by piece for operation.

In operation, wheel clutch 44 may engage axle 40 in either the forward or reverse directions. Engagement occurs when rollers 84 move to edges 87 of surfaces 88, through the drag caused by thrust bearing 114 and wave washer 112, as described above. This action causes rollers 84 to be "locked" into position between race 96 and wheel clutch cam 86, thereby bringing race 96 and casing portion 52 into engagement with cam 86 through rollers 84, and thus wheel clutch 44 into engagement with axle 40. Each surface 88 has two edges 87 at the ends thereof, thus rotation of shaft 40 in either direction will cause rollers 84 to move toward an edge 87 associated with the surface 88 upon which roller 84 is rotating. Disengagement of wheel clutch 44 occurs when rollers 84 are allowed to freely rotate between the edges of surfaces 88, or roller 84 will rotate away from an edge 87 when the hub casing 52 and race 96 are urged to rotate faster than cam 86. As can be seen, the design provides for ease of engagement and disengagement of wheel clutch 44 since mere movement of implement 20 is required for engagement and disengagement of wheel clutch 44. This allows for overrunning of the associated wheel 38 such that as implement 20 is turned, the wheel clutch 44 on the wheel 38 at the inside of the turn will disengage or partially disengage while the other wheel clutch 44 is engaged with its respective wheel 38, thereby continuing power to that wheel 38 and propelling implement 20 through the turn.

While this invention has been described as having an exemplary structure, the present invention can be further modified within the spirit and scope of this disclosure. This application is therefore intended to platform any variations, uses, or adaptations of the invention using its general principles. Further, this application is intended to platform such departures from the present disclosure as come within known or customary practice in the art to which this invention pertains and which fall within the limits of the appended claims.

What is claimed is:

1. A modular, bi-directional wheel clutch unit adapted to be assembled to the driving axle of a walk-behind machine, said unit comprising:

a rotatable wheel-driving hub including a casing portion;

a clutch cage disposed in said casing portion and surrounded thereby, said clutch cage having a plurality of circumferentially-distributed openings;

a rotatably driven cam element disposed in said casing portion and surrounded by said clutch cage, said cam element having a plurality of discrete surfaces thereon; and a plurality of rollers rotatably disposed within said casing portion and within said clutch cage openings, said rollers located between said casing portion and said cam element discrete surfaces, said rollers having an engaged position wherein said cam element and said hub are in binding engagement through said rollers and said hub is rotatably driven by said cam element, and a disengaged position wherein said hub is freely rotatable relative to said cam element;

wherein said wheel clutch unit is modular and self-contained, said unit being selectively attachable and detachable as a unit to and from said driving axle of said walk-behind machine.

2. The wheel clutch assembly of claim 1, wherein said casing is substantially cylindrical, and a race is formed on an interior surface thereof, said rollers engaging said race in their said engaged positions.

3. In combination, a walk-behind machine having an engine, an axle rotatably driven by said engine, and a pair of ground engaging wheels, one said wheel located at each end of said axle; and a modular, bi-directional wheel clutch unit adapted to be assembled to the driving axle of a walk-behind machine including:

a rotatable wheel-driving hub detachably fixed to a said wheel and including a casing portion;

a clutch cage disposed in said casing portion and surrounded thereby, said clutch cage having a plurality of circumferentially-distributed openings;

a cam element detachably fixed to said axle and disposed in said casing portion, said cam element surrounded by said clutch cage and having a plurality of discrete surfaces thereon; and a plurality of rollers rotatably disposed within said casing portion and within said clutch cage openings, said rollers located between said casing portion and said cam element discrete surfaces, said rollers having an engaged position wherein said cam element and said hub are in binding engagement through said rollers and said hub is rotatably driven by said cam element, and a disengaged position wherein said hub is freely rotatable relative to said cam element;

wherein said wheel clutch unit is modular and self-contained, said unit being selectively attachable and detachable as a unit to and from said driving axle of said walk-behind machine.

4. The combination of claim 3, wherein a said rotatable hub is attached to each said ground-engaging wheel and a said cam element is attached to each end of said axle.

5. The combination of claim 4, wherein, when a said hub and its respective said cam element are in binding engagement, its respective said ground-engaging wheel is driven by said driving axle.

6. The combination of claim 3, wherein said rollers are moved into one of their said engaged and said disengaged positions during turning of said walk-behind machine.

7. The combination of claim 6, wherein the said rollers of the clutch assembly attached to the wheel at the inside during a turn are moved into their said disengaged positions.

8. The combination of claim 3, wherein the number of said rollers is equal to the number of said cam element discrete surfaces.

9. A modular, bi-directional wheel clutch unit adapted to be assembled to the driving axle of a walk-behind machine, said unit comprising:

a rotatable casing;

a clutch cage disposed in and surrounded by said casing;

a rotatably driven cam element disposed in said casing and surrounded by said clutch cage, said cam element having a plurality of discrete surfaces thereon; and a plurality of rotatable elements rotatably disposed within said casing and within said clutch cage, said rotatable elements located between an interior surface of said casing and said cam element discrete surfaces, said casing being selectively driven by said cam element through selective engagement of said casing with said cam element through said rotatable elements;

wherein said wheel clutch unit is modular and self-contained, said unit being selectively attachable and detachable as a unit to and from said driving axle of said walk-behind machine.

10. The wheel clutch assembly of claim 9 wherein said rotatable elements have an engaged position wherein said cam element and said casing are in binding engagement through said rotatable elements and said casing is rotatably driven by said cam element, and a disengaged position wherein said cam element and said casing are not in binding engagement through said rotatable elements and said casing is not rotatably driven by said cam element.

11. The wheel clutch assembly of claim 10, wherein said casing further includes a race formed on an interior surface thereof, said rotatable elements binding said race and said cam element when said rotatable elements are in their said engaged positions.

12. The wheel clutch assembly of claim 9 wherein said casing further includes a hub portion, said hub portion being a peripheral flange on said casing portion, said hub portion being detachably fixed to a ground-engaging wheel.

13. The wheel clutch assembly of claim 12 wherein said rotatable elements have an engaged position wherein said cam element and said hub portion are in binding engagement through said rotatable elements and said hub portion is rotatably driven by said cam element, and a disengaged position wherein said hub portion is freely rotatable relative to said cam element.

14. In combination:

a walk-behind machine including:
    an engine;
    an axle driven by the engine; and
    a pair of ground-engaging wheels, one said wheel at each end of said axle; and a modular, self-contained bi-directional wheel clutch unit selectively attachable and detachable as a unit to and from the driving axle of a walk-behind machine, said unit comprising:
    a rotatable casing;
    a clutch cage disposed in and surrounded by said casing, said clutch cage having a plurality of openings along a circumference of said clutch cage;
    a rotatably driven cam element disposed in said casing and surrounded by said clutch cage, said cam element having a plurality of discrete surfaces thereon; and
    a plurality of rollers rotatably disposed within said casing and within said clutch cage openings, said rollers located between an interior surface of said casing and said cam element discrete surfaces, said casing being selectively driven by said cam element through selective engagement of said casing with said cam element.

15. The combination of claim 14, wherein said walk-behind machine further includes a frame, said frame supporting said engine and rotatably supporting said axle.

16. The combination of claim 15, wherein said wheel clutch assembly further comprises a bushing disposed adjacent said walk-behind machine and sized to fit within an opening in said rotatable casing, said bushing including a pin extending outwardly and engaging said frame of said walk-behind machine.

17. The combination of claim 14, said clutch assembly further comprising a pin extending through said axle at an end thereof, said pin retaining said clutch assembly on said axle.

18. The combination of claim 14, wherein said clutch assembly further includes a sleeve disposed within said cam element, said cam element being detachably fixed to said axle through said sleeve.

19. The combination of claim 18, said clutch assembly further comprising a bearing disposed between said sleeve and said casing portion, said casing portion being rotatable relative to said sleeve through said bearing.

20. The combination of claim 14, said clutch assembly further including an annular groove in said clutch cage and an annular groove in each said roller, said clutch cage annular groove and said roller annular grooves being aligned when said rollers are in said clutch cage openings; and an annular ring fitting into said clutch cage annular groove and said roller annular grooves, said annular ring preventing said rollers from moving radially outward from said clutch cage openings.

* * * * *